UNITED STATES PATENT OFFICE.

ALEXANDER EISENBERG, OF ST. PETERSBURG, RUSSIA.

PROCESS FOR THE PRODUCTION OF KVASS.

938,374.  Specification of Letters Patent.  Patented Oct. 26, 1909.

No Drawing.  Application filed December 4, 1908.  Serial No. 466,027.

*To all whom it may concern:*

Be it known that I, ALEXANDER EISENBERG, director brewery "Novaya Bavaria," a subject of the Czar of Russia, residing at Poljustrow Quay, St. Petersburg, Russia, have invented certain new and useful Improvements in the Process for the Production of Kvass; and I do hereby declare the following to be a full, clear, and exact description of the invention, such as will enable others skilled in the art to which it appertains to make and use the same.

Up to the present it has not been possible to produce "kvass" which could be kept for a prolonged period without undergoing change in its properties. With most kinds of "kvasses" the after-fermentation occurs only subsequent to the distribution of the "kvass" into casks or bottles, so that the peculiar qualities of the "kvass" can only be attained at a certain stage in which latter it remains only for a short period. It has previously also been impossible to interrupt the fermentation process after reaching the said stage and after one or two days at ordinary temperatures the alcohol-contents, or in sour "kvass" the acid-contents, increased so considerably as to impair the quality of the "kvass". The attempts to stop the fermentations by storing the "kvass" in cellars at low temperatures were not successful, although the alcohol-fermentation is retarded thereby, as the acetic acid-fermentation takes place even at a comparatively low temperature, preventing the lactic fermentation, which latter is the cause of the pleasant taste of the "kvass" and is of great importance in regard to its dietary qualities: In any case "kvass" as previously made could not be stored longer than seven to ten days in casks at cellar temperatures, such permanency being shown particularly by those kinds in which the acetic acid fermentation prevailed. These circumstances were of great influence on the "kvass" production, as it was impossible to produce large quantities, the makers however being compelled to keep the supply in accordance with the least variation of the demand. Consequently economic production, as in beer-brewing, could not be attained.

The process to be described makes it possible to produce a "kvass" of any desired flavor, which "kvass" may be stored for a prolonged period as shown by experiment, namely 10 days and more in bottles at ordinary temperatures, and 3 months and more in casks at a cellar temperature of 8° to 9° C., without change of its constituents. This permits the production of large quantities of "kvass" independently of the immediate demand, thereby establishing the production on an economical basis.

According to the present process, the alcohol-fermentation taking place in the wort is interrupted at a desired stage, continuation thereof as well as further acetic acid-fermentation being prevented, so that the "kvass" may be stored for a long period without causing a change in its qualities. Further, a beverage possessing the taste and flavor of any desired fruit-water can also be produced by this process from grain malt or potato flour.

The course of operations in the present process for the production of "kvass" is as follows:—Disintegrated malt, from any kind of grain such as rye, barley &c. and also potato-flour, is treated in known manner with water at 45° to 70° C., whereby the starch is separated into dextrose and maltose *i. e.* sugar formation takes place. After the complete division of the starch into maltose and dextrose, which can easily be ascertained by means of the iodid reaction, the wort obtained in such a manner is leached, strained to remove hard substances, and boiled. Hereby the albumen coagulates and at the same time the fermentation fungi and bacteria are destroyed. In this manner the wort is freed from bacteria. The mash is then led into special receptacles, where it is left to cool down to 12° to 15° C. and to deposit all the particles separated through boiling, such as coagulated albumen etc., and is subsequently drawn off from the top into other vessels for further treatment. The wort so obtained is led into fermentation vats, and the necessary quantity of repeatedly (about 7 to 8 times) cultivated yeast added: Such bacilli cultures can be produced on any desired culture medium, imparting to the beverage any desired taste. Thus, for instance, a wort produced from barley can be made to possess the taste of bread—raspberry—apple—kvass etc. by means of correspondingly cultivated yeast. The cultivated yeast which is free from bacteria and fungi finds a homogeneous culture fluid in the wort and effects only an alcohol fermentation which may be allowed to continue until the desired degree of alcohol-contents (about .5 per cent.) is reached. The wort is then skimmed whereby the yeast cells which have risen to the surface are removed, and is then drawn off from the sediments so that in the wort only yeast-cells in suspended condition remain. In order to remove the latter also, the wort is placed in a cool room where, owing to the low temperature, the suspended yeast subsides to the bottom. By means of a siphon or similar device the greater part of the wort can be drawn off from the vats. The remainder is filtered to remove the deposited yeast particles. In this manner a wort completely free from yeast is obtained. The removal of the suspended yeast may also be effected by means of centrifugal separators, which may be done at the same temperature and in the same room where the alcohol-fermentation took place. The suspended yeast particles need not however be removed, as at low temperature they are not capable of effecting an alcohol fermentation in the wort: besides, they lose this property entirely by further treatment according to the process under consideration. After the yeast is removed from the wort, a bacilli-culture of lactic fermentation fungi is introduced into the latter.

It is known that when several ferments are present, the strongest will overcome the weaker ones, effecting only a corresponding fermentation. In this case the further alcohol-fermentation as also the incipient acetic-fermentation, is prevented by the lactic-fermentation. The latter is not only harmless, but indispensable, to the "kvass", producing the agreeable taste and maturity besides providing the necessary carbonic acid, and is also of great dietary importance. With the previously known "kvasses" an unfavorably acting acetic fermentation had mostly to be dealt with, so that at the time when the required lactic acid contents had to be reached, the former was already so far advanced that no further alcohol and lactic fermentation could take place. The lactic fermentation on the other hand produces, after some time, such a quantity of lactic acid that the fermentation itself is terminated. At the temperature under which the "kvass" is usually stored, the lactic acid contents can only rise up to 0.5%. In this manner, the alcohol fermentation can be terminated at a certain stage and any desired quantity of lactic acid produced in the kvass, by regulating the temperature and time of fermentation, by removal of the yeast at the proper time and the addition of correspondingly cultivated lactic ferments. After the "kvass" has been produced in this manner, it is filtered to remove any ferments still remaining and drawn off into casks or bottles containing proportionate quantities of sugar syrup or honey and spice: the sugar not finding any ferments remains chemically unchanged. By this method a liquid is produced having only about one-half of one per cent. of alcohol and agreeable to the taste. Such "kvass" does not contain any insoluble constituents nor albumen. Furthermore, the acetic acid contents is very small, while the lactic acid is present in sufficient quantity, giving the kvass excellent dietary qualities.

The described process makes it possible, as already mentioned, to produce from grain malt or potato-flour, a kwass of any desired taste such as bread, fruit-kvass, etc. The "kvass" can be stored for a prolonged period without undergoing a change of its constituents.

Should the kvass made by this process not show quite its original qualities after prolonged storage, this must be attributed to the fact that it is not possible to remove in filtration the smallest traces of ferment substances.

What I claim is:

1. The herein described process of producing kvass, consisting in preparing a suitable wort, boiling said wort to eliminate the albumen and destroy the ferments therein, subjecting the same to the action of yeast to produce alcoholic fermentation, and adding lactic ferments which arrest the alcoholic fermentation and also prevent acetic fermentation, substantially as described.

2. The herein described process of producing kvass, consisting in preparing a suitable wort, boiling said wort to eliminate the albumen and destroy the ferments therein, adding to said wort a yeast cultivated in a culture medium corresponding to the taste desired to be obtained, and adding lactic ferments which stop the alcoholic fermentation, substantially as described.

3. The herein described process of producing kvass, consisting in preparing a suitable wort, boiling said wort to eliminate the albumen and destroy the ferments therein, adding to said wort a yeast cultivated in a culture medium corresponding to the taste desired to be obtained, separating the yeast floating on the top of the liquid, drawing off the upper portion of the wort from the deposited yeast particles, filtering the remainder and adding lactic ferments, substantially as described.

4. The herein described process of producing kvass, which consists in preparing a suitable wort, boiling said wort to eliminate the albumen and destroy the ferments therein, cooling said wort, and drawing off the liquid from the deposited particles, adding thereto a yeast cultivated in a culture medium corresponding to the taste desired to be obtained, separating the wort from the greater portion of the yeast and adding suitable lactic ferments which prevent further alcoholic fermentation, substantially as described.

In testimony whereof, I affix my signature, in presence of two witnesses.

ALEXANDER EISENBERG.

Witnesses:
H. A. LOWIAGHIN,
A. MIGHIS.